(12) United States Patent
Dagci et al.

(10) Patent No.: US 7,822,529 B2
(45) Date of Patent: Oct. 26, 2010

(54) METHOD AND APPARATUS FOR DETERMINING A PARAMETER FOR NORMALIZED INSTANTANEOUS HEAT RELEASE IN AN INTERNAL COMBUSTION ENGINE

(75) Inventors: Oguz H. Dagci, Sterling Heights, MI (US); Alan W. Brown, Canton, MI (US); Jun-Mo Kang, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 295 days.

(21) Appl. No.: 12/042,396

(22) Filed: Mar. 5, 2008

(65) Prior Publication Data
US 2008/0221774 A1   Sep. 11, 2008

Related U.S. Application Data

(60) Provisional application No. 60/893,146, filed on Mar. 6, 2007.

(51) Int. Cl.
F02D 45/00 (2006.01)
G01M 15/08 (2006.01)
G01M 15/06 (2006.01)
(52) U.S. Cl. ............... 701/102; 123/435; 73/114.28
(58) Field of Classification Search ............... 701/102; 123/435; 73/114.16–114.18, 114.26–114.28
See application file for complete search history.

(56) References Cited

U.S. PATENT DOCUMENTS

| | | | |
|---|---|---|---|
| 5,611,311 A * | 3/1997 | Tomisawa | 123/406.47 |
| 6,055,948 A | 5/2000 | Shiraishi et al. | |
| 6,276,334 B1 * | 8/2001 | Flynn et al. | 123/435 |
| 6,484,694 B2 * | 11/2002 | Thomas | 123/435 |
| 6,564,623 B2 * | 5/2003 | Zanetti | 73/114.28 |
| 6,615,129 B2 | 9/2003 | Kabasin | |
| 6,659,068 B2 * | 12/2003 | Urushihara et al. | 123/295 |
| 6,662,785 B1 | 12/2003 | Sloane et al. | |
| 6,758,177 B1 | 7/2004 | McKay et al. | |
| 6,971,365 B1 | 12/2005 | Najt et al. | |
| 6,994,072 B2 | 2/2006 | Kuo et al. | |
| 7,059,281 B2 | 6/2006 | Kuo et al. | |
| 7,063,068 B2 | 6/2006 | Nakai et al. | |
| 7,066,158 B2 | 6/2006 | Kuzuyama | |
| 7,076,360 B1 | 7/2006 | Ma | |
| 7,077,084 B2 | 7/2006 | Mallebrein | |
| 7,080,613 B2 | 7/2006 | Kuo et al. | |
| 7,128,048 B2 | 10/2006 | Yamoaka et al. | |
| 7,128,062 B2 | 10/2006 | Kuo et al. | |
| 7,167,789 B1 | 1/2007 | Froloff et al. | |
| 7,236,014 B1 | 6/2007 | McQuirk et al. | |

(Continued)

FOREIGN PATENT DOCUMENTS

WO    WO 2004-048762 A1 * 10/2004

*Primary Examiner*—Stephen K Cronin
*Assistant Examiner*—Arnold Castro

(57) ABSTRACT

Operation of an internal combustion engine selectively operative in a controlled auto-ignition combustion mode is monitored. The engine is equipped with a pressure sensing device operative to monitor in-cylinder pressure. An analog signal output from the pressure sensing device is monitored during a combustion cycle. A peak cylinder pressure and a corresponding crank angle are detected and captured during the combustion cycle. A state for a combustion parameter for the cylinder for the combustion cycle is determined based upon the peak cylinder pressure and the corresponding crank angle.

15 Claims, 3 Drawing Sheets

U.S. PATENT DOCUMENTS

| | | | |
|---|---|---|---|
| 7,469,576 B2 * | 12/2008 | Kruger | 73/114.28 |
| 7,506,536 B2 * | 3/2009 | Cornwell et al. | 73/114.28 |
| 2005/0159877 A1 * | 7/2005 | Hattori | 701/107 |
| 2006/0144356 A1 | 7/2006 | Sellnau et al. | |
| 2006/0196466 A1 | 9/2006 | Kuo et al. | |
| 2006/0196467 A1 | 9/2006 | Kang et al. | |
| 2006/0196468 A1 | 9/2006 | Chang et al. | |
| 2006/0196469 A1 | 9/2006 | Kuo et al. | |
| 2006/0236958 A1 | 10/2006 | Sun et al. | |
| 2006/0243241 A1 | 11/2006 | Kuo et al. | |
| 2007/0089697 A1 * | 4/2007 | Hara et al. | 123/90.15 |
| 2007/0107695 A1 * | 5/2007 | Kuo et al. | 123/435 |

* cited by examiner

METHOD AND APPARATUS FOR DETERMINING A PARAMETER FOR NORMALIZED INSTANTANEOUS HEAT RELEASE IN AN INTERNAL COMBUSTION ENGINE

CROSS REFERENCE TO RELATED APPLICATIONS

This application claims priority from U.S. Provisional Application No. 60/893,146 filed on Mar. 6, 2007, which is hereby incorporated herein by reference.

TECHNICAL FIELD

This disclosure relates to operation and control of internal combustion engines, and more specifically to homogeneous-charge compression-ignition ('HCCI') engines.

BACKGROUND

The statements in this section merely provide background information related to the present disclosure and may not constitute prior art.

Known spark ignition engines introduce a fuel/air mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

An engine configured for spark ignition can be adapted to operate in a homogeneous charge compression ignition ('HCCI') mode, also referred to as controlled auto-ignition combustion, under predetermined speed/load operating conditions. The controlled auto-ignition combustion comprises a distributed, flameless, auto-ignition combustion process that is controlled by oxidation chemistry. An engine operating in the HCCI mode has an intake charge that is preferably homogeneous in composition, temperature, and residual exhaust gases at intake valve closing time. Controlled auto-ignition combustion is a distributed kinetically-controlled combustion process with the engine operating at a dilute fuel/air mixture, i.e., lean of a fuel/air stoichiometric point, with relatively low peak combustion temperatures, resulting in low NOx emissions. The homogeneous fuel/air mixture minimizes occurrences of rich zones that form smoke and particulate emissions.

When an engine operates in the HCCI mode, the engine control comprises lean air/fuel ratio operation with the throttle wide open to minimize engine pumping losses. When the engine operates in the spark-ignition combustion mode, the engine control comprises stoichiometric air/fuel ratio operation, with the throttle valve controlled over a range of positions from 0% to 100% of the wide-open position to control intake airflow to achieve the stoichiometric air/fuel ratio.

SUMMARY

An internal combustion engine selectively operative in a controlled auto-ignition combustion mode is monitored. The engine is equipped with a cylinder pressure sensor operative to monitor in-cylinder pressure. An analog signal output from the cylinder pressure sensor is monitored during a combustion cycle. A peak cylinder pressure and a corresponding crank angle are detected and captured during the combustion cycle. A state for a combustion parameter for the cylinder for the combustion cycle is determined based upon the peak cylinder pressure and the corresponding crank angle.

BRIEF DESCRIPTION OF THE DRAWINGS

One or more embodiments will now be described, by way of example, with reference to the accompanying drawings, in which.

DETAILED DESCRIPTION

Figure 1:
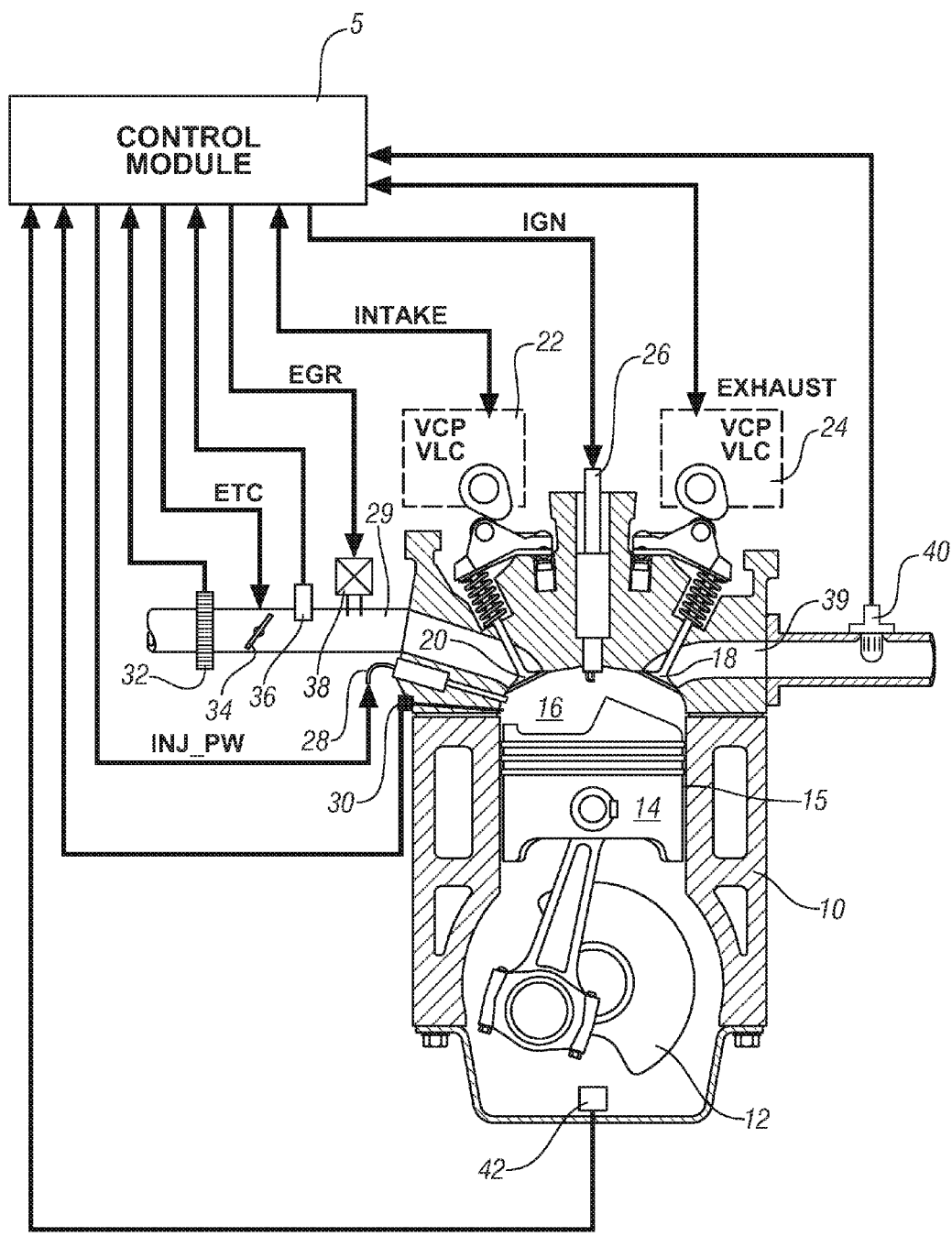
FIG. 1 is a schematic diagram of an engine system, in accordance with the present disclosure.

Referring now to the drawings, wherein the showings are for the purpose of illustrating certain exemplary embodiments only and not for the purpose of limiting the same, FIG. 1 schematically illustrates an internal combustion engine 10 and accompanying control module 5 that have been constructed in accordance with an embodiment of the disclosure. The engine 10 is selectively operative in a controlled auto-ignition mode and a spark-ignition mode. The engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating piston travel is translated to rotational motion. A single one of the cylinders 15 is shown in FIG. 1.

An air intake system channels intake air to an intake manifold which directs and distributes the air into an intake passage 29 to each combustion chamber 16. The air intake system comprises airflow ductwork and devices for monitoring and controlling the air flow. The devices preferably include a mass airflow sensor 32 for monitoring mass airflow and intake air temperature. A throttle valve 34, preferably comprising an electronically controlled device, controls air flow to the engine 10 in response to a control signal ('ETC') from the control module 5. A pressure sensor 36 is adapted to monitor manifold absolute pressure and barometric pressure in the intake manifold. An external flow passage (not shown) recirculates exhaust gases from engine exhaust to the intake manifold, controlled by an exhaust gas recirculation (hereafter 'EGR') control valve 38. The control module 5 controls mass flow of exhaust gas to the engine air intake by controlling opening of the EGR valve 38.

Air flow from the intake passage 29 into the combustion chamber 16 is controlled by one or more intake valve(s) 20. Exhaust flow out of the combustion chamber 16 is controlled by one or more exhaust valve(s) 18 to an exhaust manifold via exhaust passages 39. Openings and closings of the intake and exhaust valves 20 and 18 are preferably controlled with a dual camshaft (as depicted), the rotations of which are linked and indexed with rotation of the crankshaft 12. Device 22 preferably comprises a controllable mechanism operative to variably control valve lift ('VLC') and variably control cam phasing ('VCP') of the intake valve(s) 20 for each cylinder 15 in response to a control signal ('INTAKE') from the control module 5. Device 24 preferably comprises a controllable mechanism operative to variably control valve lift ('VLC') and variably control cam phasing ('VCP') of the exhaust valve(s) 18 for each cylinder 15 in response to a control signal ('EXHAUST') from the control module 5. Devices 22 and 24 each preferably comprises a controllable two-step valve lift mechanism operative to control magnitude of valve lift, or opening, to one of two discrete steps, e.g., a low-lift valve open position (about 4-6 mm) for load speed, low load operation, and a high-lift valve open position (about 8-10 mm) for high speed and high load operation. Devices 22 and 24 comprise variable cam phasing mechanisms to control phasing (i.e., relative timing) of opening and closing of the intake valve(s) 20 and the exhaust valve(s) 18 respectively. The variable cam phasing mechanisms shift valve opening time relative to crankshaft and piston position, referred to as phasing. The preferred VCP system may have a range of phasing authority of 60°-90° of crank rotation, thus permitting the control module 5 to advance or retard opening and closing of one of the intake valves 20 and the exhaust valves 18 relative to position of the piston 14. The range of phasing authority is defined and limited by the devices 22 and 24. Devices 22 and 24 include camshaft position sensors (not shown) to determine rotational positions of the intake and the exhaust camshafts (not shown). Devices 22 and 24 are actuated using one of electro-hydraulic, hydraulic, and electric control force, controlled by the control module 5.

The engine 10 includes a fuel injection system, comprising a plurality of high-pressure fuel injectors 28 each adapted to directly inject a mass of fuel into the combustion chamber 16, in response to a control signal ('INJ_PW') from the control module 5. The fuel injectors 28 are supplied pressurized fuel from a fuel distribution system (not shown).

The engine includes a spark ignition system by which spark energy is provided to a spark plug 26 for igniting or assisting in igniting cylinder charges in each combustion chamber 16, in response to a control signal ('IGN') from the control module 5. The spark plug 26 enhances control of combustion timing in each cylinder 15 of the engine 10 at certain conditions, e.g., during cold start and near a low load operation limit.

The engine 10 is equipped with various sensing devices for monitoring engine operation, including a crank sensor 42 operative to monitor crankshaft rotational position, i.e., crank angle θ and speed, a wide range air/fuel ratio sensor 40 adapted to monitor exhaust gas air/fuel ratio, and a cylinder pressure sensor 30 adapted to monitor in-cylinder combustion pressure in real-time, during ongoing operation of the engine 10 and output an analog signal corresponding to in-cylinder combustion pressure in real-time. The analog signal output from the cylinder pressure sensor 30 and the output signal from the crank sensor 42 are monitored by a system 50 and the control module 5 as described hereinbelow to determine combustion phasing, i.e., timing of combustion pressure relative to the crank angle θ of the crankshaft 12 for each cylinder 15 for each combustion cycle.

During operation in the controlled auto-ignition combustion mode, the engine 10 operates un-throttled on gasoline or similar fuel blends over an extended range of engine speeds and loads. The engine 10 operates in the spark ignition combustion mode with a controlled throttle operation under conditions not conducive to the controlled auto-ignition combustion mode operation, and to achieve engine power to meet an operator torque request. Fueling preferably comprises direct fuel injection into each combustion chamber 16. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used in the implementation of the present disclosure.

The control module 5 preferably comprises a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital conversion circuitry and digital to analog circuitry, and input/output circuitry and devices, and appropriate signal conditioning and buffer circuitry. The control module 5 has a set of control algorithms, comprising resident program instructions and calibrations stored in the non-volatile memory and executed to provide the respective functions of each computer. The algorithms are executed during preset loop cycles such that each algorithm is executed at least once each loop cycle. Algorithms are executed by the central processing unit to monitor inputs from the aforementioned sensing devices and execute control and diagnostic routines to control operation of the actuators, using preset calibrations. Loop cycles are executed at regular intervals, for example each 3.125, 6.25, 12.5, 25 and 100 milliseconds during ongoing engine and vehicle operation. Alternatively, algorithms may be executed in response to occurrence of an event. The control module 5 includes a calibration for the cylinder pressure sensor 30 by which it converts the analog signal output therefrom to a combustion pressure for use in analysis and processing.

Figure 2:
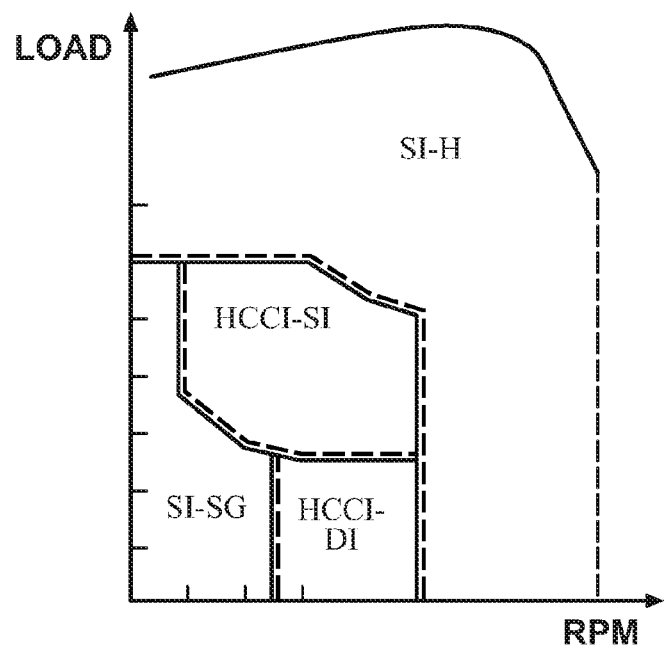
FIGS. 2 and 3 are data graphs, in accordance with the present disclosure.

FIG. 2 schematically depicts preferred operating ranges for the exemplary engine 10 in spark-ignition and controlled auto-ignition combustion modes, based upon states of engine parameters, in this embodiment comprising speed ('RPM') and load ('LOAD') which is derivable from engine parameters including the engine fuel flow and the intake manifold pressure. The engine combustion modes preferably comprise a spray-guided spark-ignition ('SI-SG') mode, a single injection controlled auto-ignition ('HCCI-SI') mode, and double injection controlled auto-ignition ('HCCI-DI') mode, and a homogeneous spark-ignition ('SI-H') mode. A preferred speed and load operating range for each of the combustion modes is based upon engine operating parameters, including combustion stability, fuel consumption, emissions, engine torque output, and others. Boundaries which define the preferred speed and load operating ranges to delineate operation in the aforementioned combustion modes are preferably precalibrated and stored in the control module 5.

Figure 3:
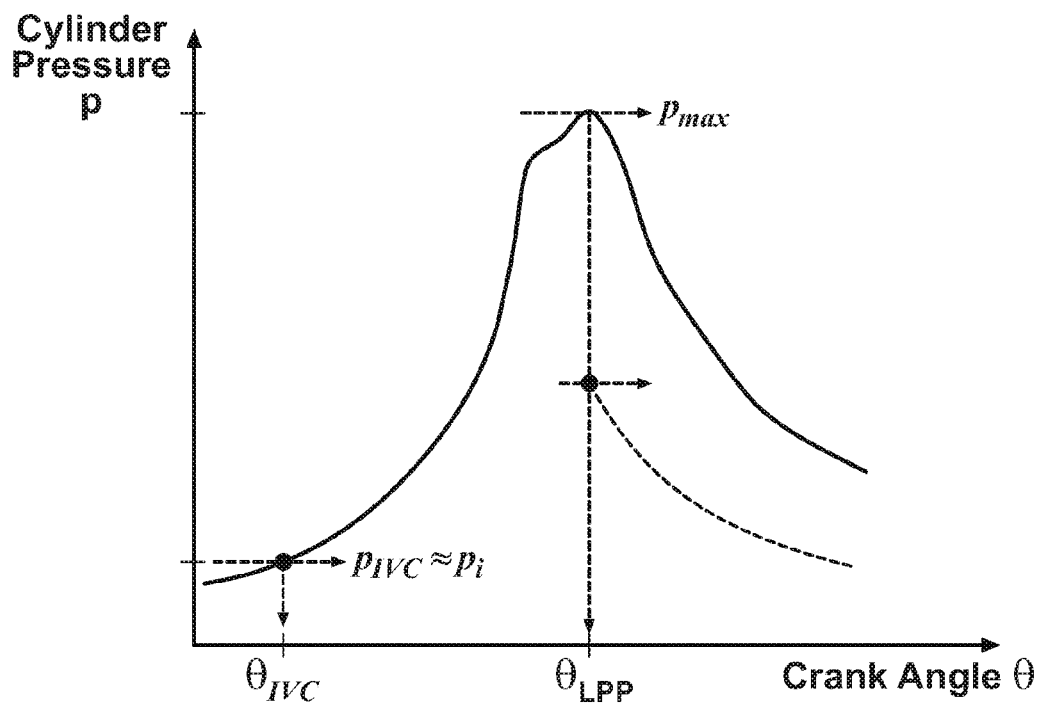

FIG. 3 graphically shows exemplary in-cylinder pressure for the engine 10 as a function of crank angle θ based upon a constant-volume ideal combustion cycle model. Combustion parameters include:

$T_{IVC}$—temperature at intake valve closing;
$T_{SOC}$—temperature at start of combustion;
$T_{EOC}$—temperature at end of combustion;
$P_{IVC}$—in-cylinder combustion pressure at intake valve closing;
$P_i$—intake manifold pressure, measurable with the pressure sensor 36;
$P_{SOC}$—in-cylinder combustion pressure at start of combustion, determined with the analog signal output from the cylinder pressure sensor 30;
$p_{max}$—peak cylinder pressure, comprising the in-cylinder combustion pressure determined with the analog signal output from the cylinder pressure sensor 30;
$V_{IVC}$—cylinder volume at intake valve closing, determined using known slider equations and inputs from the crank sensor 42 and camshaft position sensors;
$V_{LPP}$—cylinder volume at location of peak cylinder pressure ('LPP'), determined using known slider equations and inputs from the crank sensor 42;

$\theta_{IVC}$—crank angle at intake valve closing, determined using known slider equations and inputs from the crank sensor 42 and the camshaft position sensors;

$\theta_{LPP}$—crank angle corresponding to the location of the peak cylinder pressure $p_{max}$ measured using the crank sensor 42 in conjunction with the cylinder pressure sensor 30 as described hereinbelow;

$Q_{LHV}$—low heating value of fuel;

$m_f$—fuel mass;

R—the gas constant;

γ—specific heat ratio; and $C_V$—specific heat at constant volume.

Other parameters are calculated or estimated, as follows:

$$T_{SOC}=T_{IVC}*r^{\gamma-1};$$

$$r=V_{IVC}/V_{LPP}; \text{ and}$$

$$T_{EOC}=(r^{\gamma-1}+\delta)*T_{IVC}=T_{SOC}+\delta T_{IVC}.$$

A combustion parameter δ indicative of instantaneous heat release due to in-cylinder combustion can be calculated as follows:

$$\delta=(Q_{LHV}*R*m_f)/C_v*p_{IVC}*V_{IVC},$$

which can be restated as:

$$\delta=(T_{EOC}-T_{SOC})/T_{IVC}.$$

The temperatures comprise approximated cylinder charge temperatures over a combustion cycle calculated from the constant-volume ideal combustion cycle model. The constant-volume ideal combustion cycle model assumes instantaneous combustion, and is suitable to describe auto-ignited combustion, which has a fuel burning rate different from spark-ignited combustion.

The state of the combustion parameter δ is indicative of instantaneous heat release due to in-cylinder combustion for each combustion cycle, normalized by the temperature at intake valve closing $T_{IVC}$. The combustion parameter δ is determined by executing algorithmic code in the control module 5 preferably for each of the cylinders 15 and preferably during each combustion cycle. The algorithmic code to calculate the state of the combustion parameter δ comprises equations described hereinbelow which can be executed in the control module 5 with minimal burdens on processing time and the storage mediums.

The intake valve closing $\theta_{IVC}$ is determined using the signal input from the intake camshaft position sensor (not shown). Subsequent to closing the intake valve 20, the mass of air trapped in the cylinder 15 remains the same until the exhaust valve 18 opens. Thus, a relation can be derived using the ideal gas law, as follows in Eq. 1:

$$\frac{p_{SOC}}{T_{SOC}}=\frac{p_1 r^\gamma}{T_{IVC}r^{\gamma-1}}=\frac{p_{max}}{T_{EOC}}=\frac{p_{max}}{T_{IVC}(r^{\gamma-1}+\delta)}. \qquad [1]$$

The state of the combustion parameter δ, comprising normalized instantaneous heat release, is calculated using Eq. 2, as follows:

$$\delta=\frac{p_{max}}{rp_i}-r^{\gamma-1}=\frac{V_{LPP}p_{max}}{V_{IVC}p_i}-\left(\frac{V_{IVC}}{V_{LPP}}\right)^{\gamma 1}. \qquad [2]$$

The specific heat ratio γ is assumed to be constant over a complete combustion cycle. The state of the combustion parameter δ is calculated by executing an algorithm in real-time after detecting or determining the peak cylinder pressure $p_{max}$, the cylinder pressure at intake valve closing $p_{IVC}$, and the location of the peak cylinder pressure $\theta_{LPP}$ and associated cylinder volume $V_{LPP}$ and intake valve closing $\theta_{IVC}$ and associated cylinder volume, $V_{IVC}$. The peak cylinder pressure $p_{max}$ and the location of the peak cylinder pressure $\theta_{LPP}$ are measured using the cylinder pressure sensor 30 and the crankshaft sensor 42.

Figure 4:
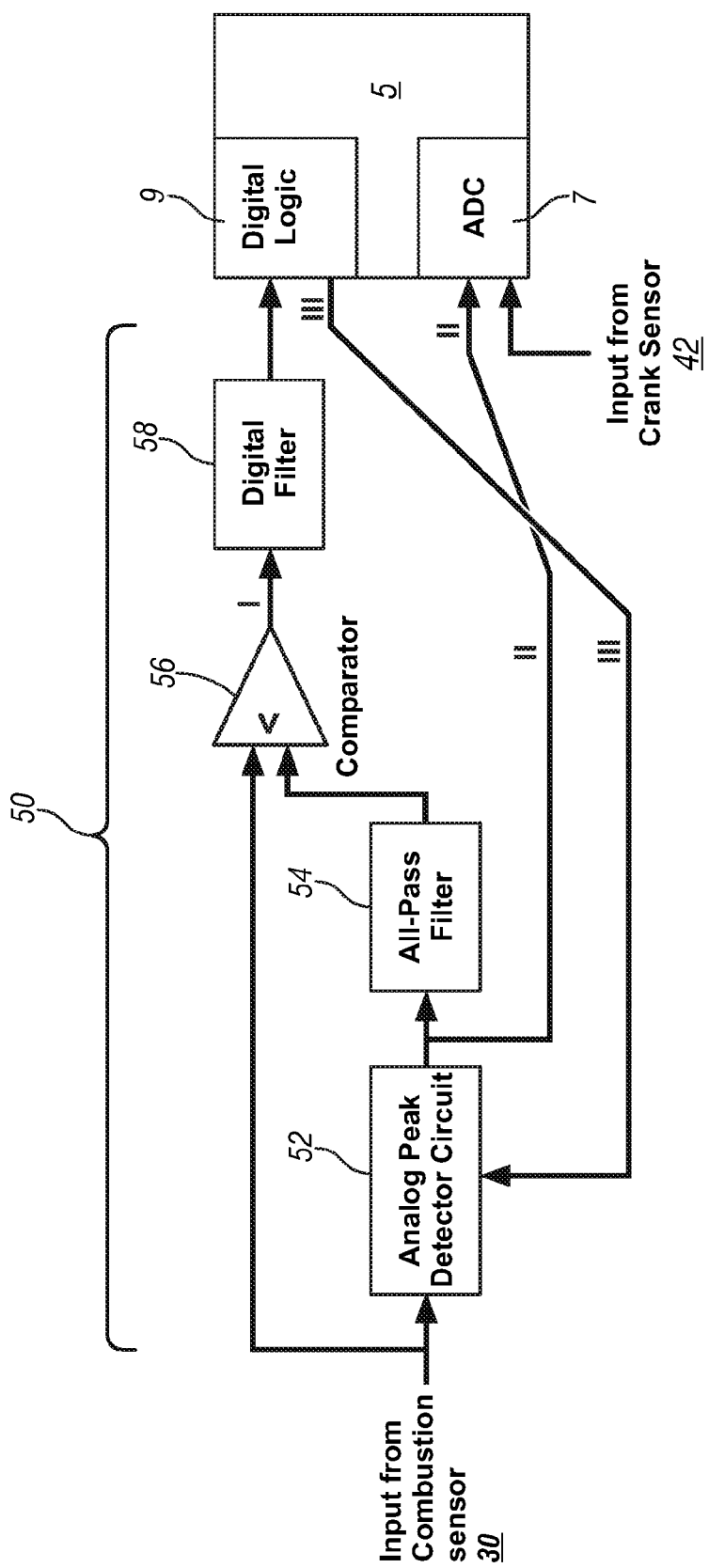
FIG. 4 is a schematic system diagram, in accordance with the present disclosure.

FIG. 4 depicts an embodiment of the system 50 to facilitate real-time calculation of the state of the combustion parameter δ. The system 50 monitors signal outputs from the cylinder pressure sensor 30 to detect a peak combustion pressure during each combustion cycle with minimal burden on the analog to digital conversion circuitry 7 and the storage mediums of the control module 5. By way of comparison, real-time monitoring of signal outputs from the cylinder pressure sensor 30 for timely and accurately determining the peak cylinder pressure $p_{max}$ during each combustion cycle for each cylinder 15 can be computationally burdensome when the cylinder pressure sensor 30 is directly signally connected to the control module 5, as the analog signal output from the cylinder pressure sensor 30 is sampled, digitally converted, stored and analyzed to identify a maximum pressure.

The analog signal output from the cylinder pressure sensor 30 and the output of the crankshaft sensor 42 comprise the signal inputs to the system 50. The system 50 comprises an analog peak detection circuit ('Analog Peak Detection Circuit') 52, an all-pass filter ('All-Pass Filter') 54, an analog comparator circuit ('Comparator') 56, and a digital filter ('Digital Filter') 58. A first output ('I') from the system 50 comprises a digital logic input to the digital logic circuit 9 of the control module 5. A second output ('II') from the system 50 comprises an analog signal output from the analog peak detector circuit 52 that is input to the analog to digital conversion circuitry 7 of the control module 5. An input ('III') from the control module 5 to the system 50 comprises a digital logic signal output from the digital logic circuit 9 to control the analog peak detector circuit 52. The analog peak detector circuit 52 preferably comprises an analog electronic circuit that monitors and stores the analog signal output from the cylinder pressure sensor 30 and is operative to detect and capture the analog signal output corresponding to the peak cylinder pressure $p_{max}$ when the input ('III') from the control module 5 comprising the digital logic signal to the analog peak detector circuit 52 switches from a digital logic '0' to a digital logic '1'. The analog peak detector circuit 52 signally captures the analog signal output from the cylinder pressure sensor 30 corresponding to the peak cylinder pressure $p_{max}$ and inputs it to the analog/digital converter 7 of the control module 5.

The all-pass filter 54 preferably comprises an electronic signal processing circuit operative to insert a predetermined time delay in its input signal without introducing any signal distortion, and provide a time-delayed analog output signal. In the system 50, the input to the all-pass filter 54 is the analog signal output from the analog peak detection circuit 52 with output of the all-pass filter 54 signally connected to the analog comparator circuit 56.

The analog comparator circuit 56 preferably comprises a dual input analog comparator having a digital output, i.e., one of a digital logic '0' and a digital logic '1'. The output of the analog comparator circuit 56 passes through a digital filter 58, and is input to the digital logic circuit 9 of the control module 5 for logic analysis. The output of the digital filter 58 is normally a digital logic '0'. When the output of the digital filter 58 switches to a digital logic '1', the control module 5 commands the digital logic signal ('III') input to the analog peak detector circuit 52 to switch. The control module 5 captures the analog signal output of the analog peak detection circuit 52 at the analog-to-digital converter 7 of the control module 5 to determine the peak cylinder pressure $p_{max}$ and captures the input from the crank sensor 42 to determine the corresponding crankshaft position for the peak pressure, which is stored as the location of peak cylinder pressure $\theta_{LPP}$.

The analog comparator circuit 56 continuously monitors the analog signal output of the cylinder pressure sensor 30 to determine when it is less than the maximum value of the output of the all-pass filter 54. When the delayed analog signal output is greater than the analog signal output by an amount greater than a threshold, the maximum pressure signal is detected and the analog comparator circuit 56 toggles its digital output. The threshold for the analog comparator circuit 56 preferably comprises a precalibrated integrated signal difference which permits the digital output of the analog comparator circuit 56 to toggle when the difference between the inputs thereto exceed the threshold. The threshold comprises a precalibrated parameter determined based on expected noise levels for the analog signal outputs of the cylinder pressure sensor 30 and an allowable delay limit.

The control module 5 converts the analog signal output from the analog peak detector circuit 52 to a digital signal corresponding to the cylinder pressure. The terms $V_{IVC}$ and $P_{IVC}$ are calculated and measured, respectively. The substance of Eqs. 1 and 2 are converted to executable code, and a state for the combustion parameter δ, comprising the normalized instantaneous heat release, is calculated thereby, preferably for each cylinder 15 during each combustion cycle. The code also resets the analog peak detector circuit 52 in preparation for the subsequent cycle. Code can be used to compensate for errors introduced to the location of peak cylinder pressure $\theta_{LPP}$ as the result of known delays in the analog comparator circuit 56 and the digital filter 58 using the signal output from the crank sensor 42. The circuitry includes signal processing schemes and elements, depicted as the digital filter 58 to prevent high frequency switching as a result of the analog comparison. The digital filter 58 filters out pulses from the comparator 56 having a duration that is less than a predetermined threshold. The digital filter 58 may be implemented within the control module 5. System 50 and the functions associated therewith can be implemented either in a separate integrated circuit having input to the control module 5 or within the control module 5. The analog and digital circuitry of the system 50 can also be implemented using discrete electronic components with inputs to the control module 5.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring operation of an internal combustion engine, comprising:
   equipping the engine with a pressure sensing device operative to monitor in-cylinder pressure;
   operating the engine in a controlled auto-ignition combustion mode;
   monitoring an analog signal output from the pressure sensing device during a combustion cycle;
   detecting and capturing the analog signal output from the pressure sensing device corresponding to a peak cylinder pressure during the combustion cycle;
   identifying a crank angle whereat the peak cylinder pressure occurs during the combustion cycle; and
   calculating a state for a combustion parameter indicative of instantaneous heat release due to in-cylinder combustion based upon the peak cylinder pressure and the crank angle whereat the peak cylinder pressure occurs during the combustion cycle.

2. The method of claim 1, wherein detecting the analog signal output from the pressure sensing device corresponding to the peak cylinder pressure during the combustion cycle comprises:
   time-delaying the analog signal output from the pressure sensing device;
   comparing the analog signal output from the pressure sensing device and the time-delayed analog signal; and,
   identifying when the analog signal output from the pressure sensing device is less than the time-delayed analog signal.

3. The method of claim 2, comprising capturing the analog signal output from a peak detection circuit when the analog signal output from the pressure sensing device is less than the time-delayed analog signal.

4. The method of claim 3, comprising identifying the crank angle corresponding to the analog signal output from the peak detection circuit.

5. The method of claim 4, further comprising calculating a state for the combustion parameter indicative of instantaneous heat release due to in-cylinder combustion for each cylinder for each combustion cycle.

6. The method of claim 1, comprising:
   determining a cylinder volume at the crank angle whereat the peak cylinder pressure occurs during the combustion cycle;
   determining a cylinder pressure at a closing of an intake valve for the combustion cycle;
   determining a cylinder volume at the closing of the intake valve for the combustion cycle; and
   calculating the state for the combustion parameter indicative of instantaneous heat release due to in-cylinder combustion based upon the peak cylinder pressure, the cylinder pressure at the closing of the intake valve for the combustion cycle, the cylinder volume at the location of the peak cylinder pressure, and the cylinder volume at the closing of the intake valve for the combustion cycle.

7. The method of claim 6, further comprising calculating the state for the combustion parameter indicative of the instantaneous heat release due to in-cylinder combustion for each cylinder for each combustion cycle.

8. Method for monitoring operation of a multi-cylinder internal combustion engine selectively operative in a controlled auto-ignition combustion mode, comprising:
   operating the engine in the controlled auto-ignition combustion mode;
   monitoring an analog signal output from each of a plurality of pressure sensing devices each operative to monitor pressure in one of the cylinders of the engine during each combustion cycle;
   detecting the analog signal output from each of the plurality of pressure sensing devices corresponding to a respective peak cylinder pressure during each combustion cycle;

capturing the analog signal output from each of the plurality of pressure sensing devices corresponding to the respective peak cylinder pressure during each combustion cycle;

identifying a crank angle whereat the respective peak cylinder pressure occurs during each combustion cycle for each of the cylinders; and calculating a state for a combustion parameter for each of the cylinders for each combustion cycle based upon the peak cylinder pressure and the crank angle whereat the peak cylinder pressure occurs during the combustion cycle for each of the cylinders.

9. The method of claim 8, wherein detecting the analog signal output from each of the plurality of pressure sensing devices corresponding to the respective peak cylinder pressure during each combustion cycle comprises:

time-delaying the analog signal output from one of the pressure sensing devices;

comparing the analog signal output from the one of the pressure sensing devices and the time-delayed analog signal output from the one of the pressure sensing devices; and identifying when the analog signal output from the one of the pressure sensing devices is less than the time-delayed analog signal from the one of the pressure sensing devices.

10. The method of claim 9, comprising capturing the analog signal output from a peak detection circuit when the analog signal output from the one of the pressure sensing devices is less than the time-delayed analog signal from the one of the pressure sensing devices.

11. The method of claim 10, comprising identifying the crank angle corresponding to the analog signal output from the peak detection circuit for the respective cylinder.

12. A system to monitor operation of an internal combustion engine selectively operative in a controlled auto-ignition combustion mode, comprising:

the internal combustion engine including a pressure sensing device operative to monitor in-cylinder pressure and a crank angle sensor;

the pressure sensing device signally connected to an analog peak detector circuit;

the analog peak detector circuit signally connected to and controllably connected to an engine control module;

the crank angle sensor signally connected to the engine control module; and the engine control module:

commanding the analog peak detector circuit to capture an analog signal output from the pressure sensing device corresponding to a peak cylinder pressure during a combustion cycle for the cylinder;

identifying a crank angle corresponding to the peak cylinder pressure during the combustion cycle for the cylinder;

reading the captured analog signal output from the analog peak detector circuit;

converting the captured analog signal output from the analog peak detector circuit to the corresponding peak cylinder pressure; and calculating a state for a combustion parameter for the cylinder for the combustion cycle based upon the peak cylinder pressure and the corresponding crank angle.

13. The system of claim 12, comprising:

an electronic circuit operative to execute a time delay in the analog signal output from the peak detection circuit; and a comparator operative to compare the time-delayed analog signal output and the analog signal output;

wherein an output of the comparator comprises a digital signal input to the control module.

14. The system of claim 13, comprising the comparator operative to identify when the analog signal output from the pressure sensing device is less than the time-delayed analog signal by an amount greater than a predetermined threshold.

15. The system of claim 13, comprising capturing the analog signal output from the peak detection circuit when the analog signal output from the pressure sensing device is less than the time-delayed analog signal.

* * * * *